United States Patent Office 3,313,603
Patented Apr. 11, 1967

3,313,603
BORANE COMPOUNDS AND THEIR
PREPARATION
William V. Hough, Gibsonia, and Joseph M. Makhlouf, Mars, Pa., assignors to Callery Chemical Company, Pittsburgh, Pa., a corporation of Pennsylvania
No Drawing. Filed May 29, 1964, Ser. No. 371,891
10 Claims. (Cl. 23—358)

This invention relates to the novel compounds ammonium hydrotriborate and alkylammonium hydrotriborates of the general formula $(RR'R''NH)B_3H_8$, where R, R' and R" are hydrogen or unsubstituted lower alkyl groups having from 1 to 5 carbon atoms. This invention also relates to a novel method of making these compounds.

According to the literature ammonium borohydride, made at low temperatures, begins to decompose with the evolution of hydrogen at −30° C. and cannot exist at room temperature. In view of this it was believed by the inventors hereof that the hypothesized hydrotriborates having at least one N–H bond in the cation were incapable of existence. Initial experiments using sodium hydrotriborate as a starting material resulted in no identifiable ammonium hydrotriborate, completely supporting this view.

Contrary to all indications we have now discovered that the ammonium hydrotriborates of this invention can be produced successfully and that they are stable compounds. It is a part of our discovery that these materials can be produced in stable form if they are of a high order of purity. In view of the well known instability of borane structures in water and lower alkyl alcohols, it was highly unexpected, as we have discovered not only that pentaborane(9) can be reacted with ammonium hydroxide or ammonia in a water or alcohol solution to produce ammonium hydrotriborate, but also that this product is stable in water and alcohols. We have further discovered that the mono-, di-, and tri(lower) alkyl ammonium hydrotriborates are stable compounds and that these can be obtained by the reaction of the corresponding amine with ammonium hydrotriborate.

The following example illustrates a procedure for making ammonium hydrotriborate according to this invention. A two liter, three-neck, round bottom flask was provided with a magnetic stirring bar. To this was added 706 g. of reagent grade methanol and 143 ml. of 14.8 N ammonium hydroxide. A reflux condenser was attached to one side of the flask and led into a mercury bubbler and in turn to a wet test meter. The other two necks were provided with the pentaborane addition tube and a hydrolysis head respectively. The flask was flushed with a gentle stream of nitrogen for five minutes before any pentaborane was added. A 15° C. bath was placed around the reaction flask and then a pre-measured amount (706 mmole) of pentaborane was added dropwise, keeping the reaction temperature at approximately 23° C. Upon complete addition of the pentaborane, the vessel was subjected to reduced pressure until all volatile materials were evaporated. 300 ml. of freshly distilled acetonitrile was added to the reaction pot to extract the product. Two phases resulted and a medium porosity glass filter was used to separate the phases. The soluble fraction was placed on the vacuum line and acetonitrile removed leaving a residue. This residue was collected and slurried in 500 ml. of benzene, then filtered, washed twice with pentane, and then dried in vacuo. The resulting product was 26.3 g. of ammonium hydrotriborate, representing a 65% yield.

Ammonium hydrotriborate, $NH_4B_3H_8$, is a crystalline solid even though it contains more hydrogen by weight than ethane. It undergoes no detectable decomposition at 60° C. for at least 70 hours when checked for volatile products and by X-ray and infra-red analysis. It decomposes slowly at temperatures above 60° C. and has a density of 0.72 g./cc.

Analyses of products from two typical runs gave the following results

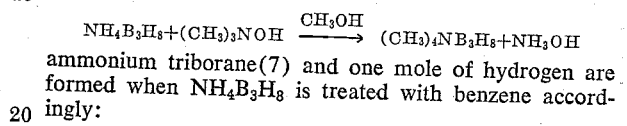

| Run | B | C | H | N |
|---|---|---|---|---|
| 1 | 51.6 | 1.2 | 206 | 17.9 |
| 2 | 51.5 | 1 | 208 | 18.3 |
| Theory | 51.4 | 0 | 205 | 17.1 |

Solutions of ammonium hydrotriborate yield tetramethylammonium hydrotriborate quantitatively when tetramethylammonium hydroxide is added according to the following reaction:

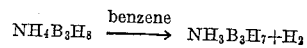

$$NH_4B_3H_8 + (CH_3)_3NOH \xrightarrow{CH_3OH} (CH_3)_4NB_3H_8 + NH_3OH$$

ammonium triborane(7) and one mole of hydrogen are formed when $NH_4B_3H_8$ is treated with benzene accordingly:

$$NH_4B_3H_8 \xrightarrow{benzene} NH_3B_3H_7 + H_2$$

The infra-red spectrum of $NH_4B_3H_8$ is consistent with that expected for $NH_4^+$ and $B_3H_8^-$ ions, and it possesses a unique X-ray pattern as follows:

| d | I | d | I |
|---|---|---|---|
| 4.60 | M | 2.21 | W |
| 4.20 | VS | 1.96 | VW |
| 3.75 | M | 1.90 | VW |
| 3.65 | VS | 1.82 | VW |
| 2.75 | M | 1.67 | VW |
| 2.60 | M | 1.62 | VW |
| 2.50 | M | 1.51 | VW |
| 2.33 | W | 1.44 | VW |
| | | 1.37 | VW |

Ammonium hydrotriborate is soluble in water and methanol without any visible signs of reaction. It is soluble in bases such as ammonia and acetonitrile, but insoluble in hydrocarbons such as pentane and benzene and is soluble in simple ethers. Gassing is observed when diethyl ether or benzene is added to $NH_4B_3H_8$ and slow decomposition to $NH_3B_3H_7$ occurs, but the pure compound is relatively stable with these solvents.

The density of $NH_4B_3H_8$ is of the order of 0.72 g./cc. and its heat of formation has been determined experimentally to be 126.7±8 kcal./mol. A methanol solution of $NH_4B_3H_8$ containing 0.075 mol/l. gave a resistance of 128 ohms compared with 104 ohms for a 0.077 mol/l. solution of tetramethylammonium chloride and 30 x 10^4 ohms for methanol.

We believe that product purity is essential to stability and that the procedure for making this material as described herein produces a stable product because of its high purity. The hydrogen content obtained by combustion analysis is not accurate enough to give an experimental value to establish product purity exactly, but values between 200 and 210 mat H/g. (theory is 205) coupled with infra-red spectral analysis and less than one mat C./g. (from the solvents) shows that the product is between 97–100% pure. In this state of purity, relative purity is determined by thermal stability. We have discovered that when methylene chloride is substituted for benzene in the slurry step, a more stable product is obtained. The impurities which we believe lead to instability of the product have not been conclusively identified but they are believed to be ammonium salts or ammonia adducts of either boron hydride containing anions or borates. Boron hydride anions other than $B_3H_8^-$ arise from impurities in the pentaborane. To produce a stable, i.e. pure, product either pure pentaborane, which is not practically obtainable, can be used, or suitable product purification must be used.

In making the ammonium hydrotriborate, we prefer to use a solution of ammonium hydroxide in a lower alkyl alcohol, having from 1 to 5 carbon atoms, which forms a water-alcohol solution. However, we have also found it practical to use either ammonium hydroxide alone, or ammonia in a lower alkyl alcohol. The temperature of reaction is not critical, however, it should be kept below that temperature at which the product begins to decompose or react with alcohol, about 40° C. The preferred temperature of reaction is between about 0° C. and 25° C. for suitable reaction rate and high yields.

Monoethylammonium hydrotriborate, $$CH_3CH_2NH_3B_3H_8$$

was prepared by condensing an excess (20 ml.) of monoethylamine on 50.5 mmoles of ammonium hydrotriborate at −196° C. The reaction mixture was warmed to 0° C. and maintained at this temperature for four and one-half hours. The volatiles (NH₃ and excess monoethyl amine) were then evaporated and the liquid product was dried in vacuo. Monoethylammonium hydrotriborate, $$CH_3CH_2NH_3B_3H_8$$

was produced quantitatively according to the following reaction:

$$CH_3CH_2NH_2(excess) + NH_4B_3H_8 \rightarrow CH_3CH_2NH_3B_3H_8 + NH_3$$

The product analysis gave (in mat/g.): B, 33.9; C, 24.4; H, 191; and N, 11.8, as compared with the theoretical of B, 34.7; C, 23.2; H, 185; and N, 11.6. The monoethylammonium ion and hydrotriborate ion were further identified by infra-red analysis. In like manner we produced, quantitatively from ammonium hydrotriborate and the corresponding amine, mono-, di-, and trimethylammonium hydrotriborate, triethylammonium hydrotriborate, and t-butylammonium hydrotriborate. The ethyl derivatives are liquids at room temperature while the methyl and t-butyl (M.P. 109.1° C.) derivatives are solids at room temperatures. All products were identified by elemental analysis and by infra-red analysis. The solid products, in addition, gave distinctive X-ray patterns.

The new compounds of this invention serve as additives to metal-containing solid propellants for the purpose of cooling the combustion gas stream due to their high hydrogen content. The ethyl derivatives make excellent high energy liquid propellants due to their relative stability and high energy content, about 25,000 B.t.u./lb. for monoethylammonium hydrotriborate. They are also useful as gas generating igniters in propellant systems. As a result of their very high boron and hydrogen content, they are also useful for the absorption of high energy neutrons. Further they are excellent reducing agents for organic functional groups such as carbonyl. In addition, ammonium hydrotriborate is an excellent source of pure hydrogen which is obtained by gentle decomposition at elevated temperatures such as 100° C.

According to the provisions of the patent statutes we have explained the principle and mode of practicing our invention and have described what we now consider to be its best embodiments. However, we desire to have it understood that, within the scope of the appended claims the invention may be practiced otherwise than as specifically described.

We claim:
1. A compound of the formula (R, R′, R″NH)B₃H₈, where R, R′ and R″ are selected from the group consisting of hydrogen, and lower alkyl having from 1 to 5 carbon atoms in each group.
2. The compound ammonium hydrotriborate.
3. The compound monomethyl ammonium hydrotriborate.
4. The compound dimethylammonium hydrotriborate.
5. The compound trimethylammonium hydrotriborate.
6. The compound monoethylammonium hydrotriborate.
7. The compound triethylammonium hydrotriborate.
8. The compound T-butylammonium hydrotriborate.
9. A method of making ammonium hydrotriborate which comprises reacting pentaborane(9) with ammonia in a solvent selected from the group consisting of water, lower alkyl alcohols, and mixtures thereof, and recovering the ammonium hydrotriborate produced thereby.
10. That method in accordance with claim 9 in which the reaction is conducted at a temperature between about 0° C. and 25° C.

References Cited by the Examiner
UNITED STATES PATENTS 3,148,938　9/1964　Knoth _____ 23—358
3,219,499　11/1965　Graham _____ 149—22

OSCAR R. VERTIZ, *Primary Examiner.*

CARL D. QUARFORTH, *Examiner.*

L. A. SEBASTIAN, M. WEISSMAN,
　　　　　　　　　　　*Assistant Examiners.*